Nov. 17, 1964    J. PICKLES    3,157,441
VEHICLE SEAT TRACK
Filed June 18, 1962
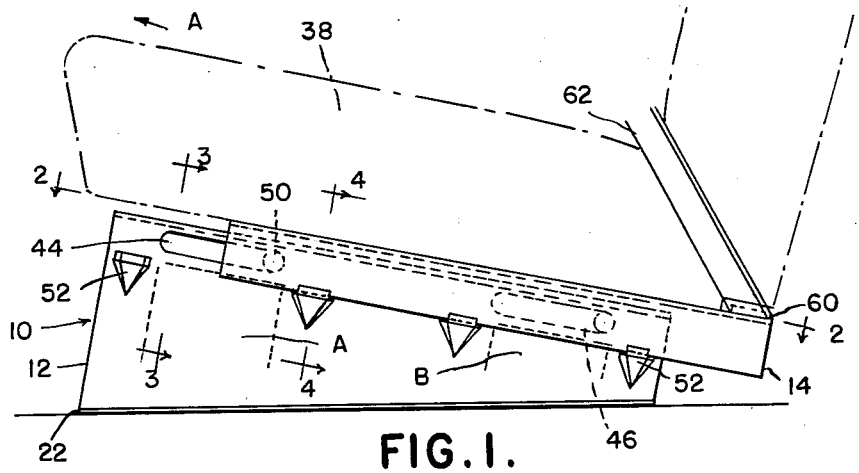
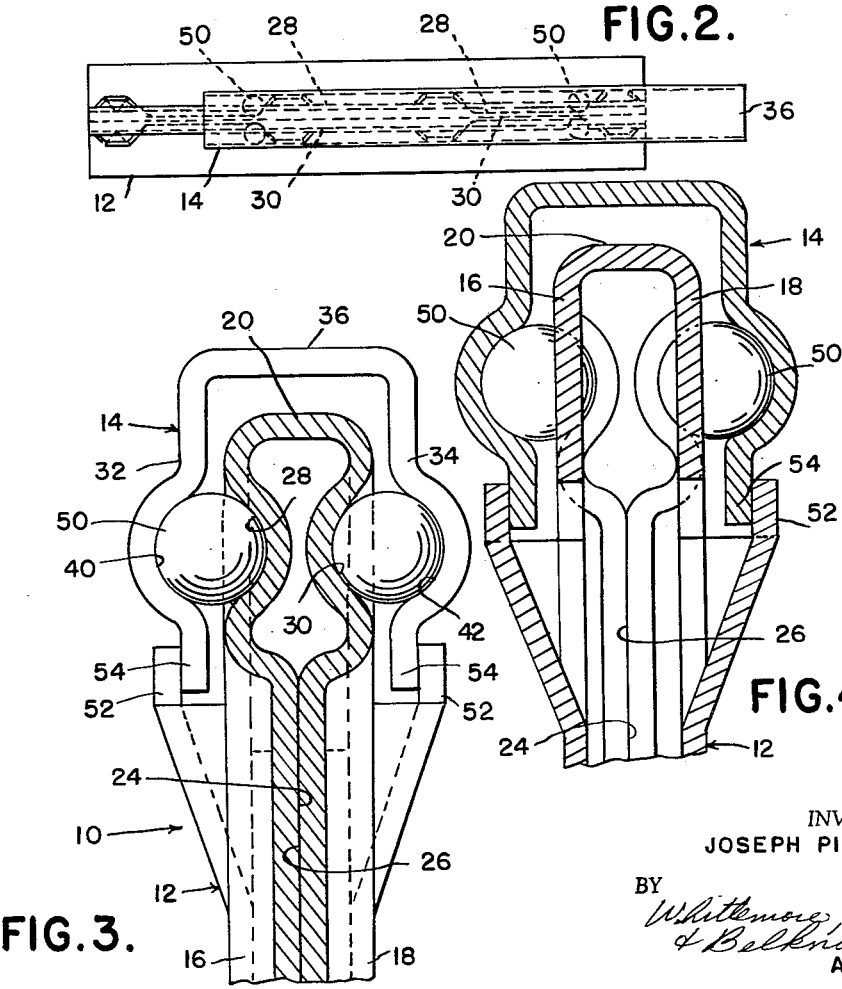
INVENTOR.
JOSEPH PICKLES
BY
Whittemore, Hulbert
& Belknap
ATTORNEYS

United States Patent Office 3,157,441
Patented Nov. 17, 1964

3,157,441
VEHICLE SEAT TRACK
Joseph Pickles, Dearborn, Mich., assignor to Ferro Stamping Company, Detroit, Mich., a corporation of Michigan
Filed June 18, 1962, Ser. No. 203,253
1 Claim. (Cl. 308—3.8)

This invention relates to a slidable seat track assembly and more particularly to an assembly having a sufficiently strong connection between the stationary member and the seat supporting slide or movable member to permit connection of a seat belt to the slide member rather than to the floor or body of the vehicle.

With such a construction it is necessary that the stationary member and seat supporting slide member be assembled in such a manner so as to avoid rattling and which lends itself to accurate calculation of strength opposing separation between the stationary and slide members.

It is an object of the present invention to provide a slidable seat track assembly comprising a unitary stationary member of inverted U-shaped cross-section having a pair of side walls, a seat supporting slide member of inverted U-shaped cross-section having a pair of downwardly turned flanges which are spaced laterally outwardly from the walls, longitudinally extending grooves of arcuate cross-section formed in each of the walls and flanges and defining a pair of ball races, and a ball in each of the races for guiding the slide member during lengthwise movement with respect to the stationary member.

Another object of the present invention is to provide a seat track assembly of the aforementioned type wherein means are carried by the stationary member for laterally restraining the flanges of the slide member against displacement under load and in particular under relatively extreme loads which are occasioned by the sudden stopping of the automobile due to an emergency situation.

Still another object of the present invention is to provide a slidable seat track assembly of the aforementioned type wherein the restraining means comprises a plurality of longitudinally spaced lugs on the side walls of the stationary member, said lugs overlying the edges of the flanges on the slide member.

A further object of the present invention is to provide a slidable seat track assembly of the aforementioned type wherein the lugs are located lengthwise from the ends of the ball races.

A still further object of the present invention is to provide a slidable seat track assembly of the aforementioned type wherein the aforesaid lugs are struck out of the side walls of the stationary member.

Another object of the present invention is to provide a slidable seat track assembly of the aforementioned type wherein the seat supporting slide member includes means for anchoring a seat belt, strap, or the like.

Still another object of the present invention is to provide a slidable seat track assembly of the aforementioned type which is manually operated.

It is a further object of the present invention to provide a simplified low-cost structure of the aforementioned type having certain advantages contributing to efficiency, reliability, and long life, as well as ease of maintenance.

FIGURE 1 is an elevated view of the slidable seat track assembly with the seat, including the slide member, located in its rearward position.

FIGURE 2 is a top plan view of the slidable seat track assembly taken substantially on the line 2—2 of FIGURE 1.

FIGURE 3 is a view, partly in section, taken on the line 3—3 of FIGURE 1.

FIGURE 4 is a sectional view taken on the line 4—4 of FIGURE 1.

Referring now to the figures, there is shown a single device or mechanism for supporting and adjusting a seat, as an example, the front seat of an automobile. It will be appreciated that two such devices are provided and that these devices are connected to opposite ends of the seat.

In FIGURE 1 the slidable seat track assembly is designated by the numeral 10 and comprises an elongated base or stationary member 12 and a seat supporting slide or movable member 14. The stationary member 12 and slide member 14 are interconnected by a plurality of balls as will subsequently appear to permit lengthwise movement of the slide member 14 with respect to the stationary member 12.

The stationary member 12 is of unitary construction and of inverted U-shaped cross-section. The stationary member 12 includes a pair of side walls 16 and 18 interconnected by a bridge, wall, or member 20. The stationary member 12 also includes an outwardly turned flange 22 at the bottom thereof which is adapted to be connected or anchored to the floor of the vehicle.

The side walls 16 and 18 are laterally spaced apart except at two predetermined areas indicated in FIGURE 1 by letters A and B. At these areas the side walls 16 and 18 are moved laterally together so that their inner surfaces 24 and 26 respectively are in surface-to-surface contact as best illustrated in FIGURES 3 and 4. Portions of the side walls 16 and 18 immediately above the areas A and B are each provided with longitudinally extending grooves 28 and 30 respectively of arcuate cross-section.

The slide member 14 is of unitary construction and of substantially inverted U-shaped cross-section. The slide member 14 includes a pair of downwardly extending flanges 32 and 34 which are interconnected by a web member 36 to which the seat 38 is appropriately connected. The flanges 32 and 34 are laterally spaced from the side walls 16 and 18 and are provided with longitudinally extending grooves 40 and 42 of arcuate cross-section. The arcuate grooves provided in the flanges and side walls define two pairs of ball races 44 and 46 at the front and rear of the seat track assembly. Each ball race is adapted to receive a ball, bearing, or the like 50 which permits the slide member 14 to be moved lengthwise with respect to the stationary member 12.

Spaced lengthwise from the ends of the ball races are a plurality of integral restraining lugs 52 which are struck out of the side walls 16 and 18 of the stationary member 12 and adapted to overlie the edges 54 of the flanges 32 and 34 as best illustrated in FIGURES 3 and 4. With such a construction, in the event of an excessive load being applied to the slide member 14, the lugs 52 prevent the flanges 32 and 34 from being displaced laterally outwardly from the side walls 16 and 18.

The slide member 14 includes fastening means 60 to which a seat belt 62 is connected. The belt 62 is provided with a very strong mounting connection on each end thereof. The ball races 44 and 46 each have a certain length to provide a predetermined amount of seat travel. The balls 50 are held in the ball races due to the divergency of the side walls 16 and 18 at the opposite ends of the ball races. In other words, the side walls 16 and 18 include laterally extending abutments which prevent the balls 50 from escaping from the ball races 44 and 46.

It should be observed that the side walls 16 and 18 are so shaped immediately above areas A and B, as best illustrated in FIGURE 3, so as to form a figure 8. The grooves 28 and 30 and grooves 40 and 42 for the balls 50 are relatively deep. The ball raceways co-operate with the lugs 52 to prevent separation of the slide member 14 from the stationary member 12 during the application of extremely heavy loads to the slide member 14.

In operation, assume that the seat 38 is located in the rearward position illustrated in FIGURE 1 and that it is desired to move the seat 38 forward in the direction of arrow A. The operator of the vehicle, resting on the seat 38 with the seat belt 62 strapped around him, moves his body so as to move the slide member 14 forwardly with respect to the stationary member 12 to the desired position. Means, not shown, may be provided for latching the slide member 14 in the desired position as is well known in the art.

It should be observed that in the event the automobile or vehicle is suddenly stopped due to an emergency situation, relatively heavy vertical loads are applied to the slide member 14 in an upward direction. In the event that the lugs 52 were not utilized, the flanges 32 and 34 of the slide member 14 would tend to move laterally outwardly away from the side walls 16 and 18 and separate from the stationary member 12. Such an arrangement would place the person in the seat in considerable danger. The present invention provides a means for positively preventing lateral displacement of the flanges 32 and 34. The lugs 52 which are integral with the side walls 16 and 18 prevent the flanges 32 and 34 from being displaced laterally. In the event the vertical loads applied to the seat member 14 should bend the bridge or wall 36 or otherwise deform the slide member 14, it has been found that such a construction helps to prevent separation of the movable member 14 from the stationary member 12 due to the relative depth of the ball raceways or grooves and the use of relatively large balls.

The present invention provides a relatively strong connection between the slide member and stationary member which is capable of withstanding extremely heavy vertical loads applied to the slide member upon braking of the vehicle.

The drawing and the foregoing specification constitute a description of the improved vehicle seat track in such full, clear, concise, and exact terms as to enable any person skilled in the art to practice the invention, the scope of which is indicated by the appended claim.

What I claim as my invention is:

A slidable seat track assembly comprising a substantially horizontally elongated stationary member of inverted U-shaped cross-section having a pair of side walls which are spaced apart, said side walls having inwardly pressed grooves formed therein extending lengthwise thereof and adjacent the front and rear thereof, the portions of said side walls beneath said grooves being pressed inwardly into surface to surface contact with one another to strengthen said stationary member, the intermediate laterally extending surfaces of said side walls at the ends of said grooves forming ball retaining abutments, a seat supporting slide member of inverted U-shaped cross-section having a pair of downwardly turned flanges which are spaced laterally outwardly from said walls, said flanges having outwardly pressed grooves formed therein extending lengthwise thereof and located opposite the grooves in said side walls to define therewith a pair of front and a pair of rear ball races, a ball in each of said races for guiding said slide member during lengthwise movement with respect to said stationary member, the longitudinal movement of said slide member with respect to said stationary member in either direction being limited by the engagement of said balls with the opposite ball retaining abutments, and means carried by said stationary member for laterally restraining said flanges against displacement under load, said means comprising a plurality of longitudinally spaced lugs integrally connected to and bent laterally outwardly from portions of said walls which are spaced apart, said lugs overlying the edges of said flanges and located beyond the ends of said ball races.

References Cited in the file of this patent

UNITED STATES PATENTS

| | | |
|---|---|---|
| 2,702,582 | Potter | Feb. 22, 1955 |
| 2,947,353 | Von Wimmersperg | Aug. 2, 1960 |